(12) United States Patent
Love

(10) Patent No.: US 12,656,744 B2
(45) Date of Patent: Jun. 16, 2026

(54) CV AUTO-CALIBRATED BRIDLE METHOD AND SYSTEM

(71) Applicant: TAIT TOWERS MANUFACTURING, LLC, Lititz, PA (US)

(72) Inventor: James D. Love, Lititz, PA (US)

(73) Assignee: TAIT TOWERS MANUFACTURING, LLC, Lititz, PA (US)

( * ) Notice: Subject to any disclaimer, the term of this patent is extended or adjusted under 35 U.S.C. 154(b) by 680 days.

(21) Appl. No.: 18/083,984

(22) Filed: Dec. 19, 2022

(65) Prior Publication Data

US 2024/0201636 A1 Jun. 20, 2024

(51) Int. Cl.
| | |
|---|---|
| *G05B 11/01* | (2006.01) |
| *A63J 5/12* | (2006.01) |
| *G06T 7/70* | (2017.01) |

(52) U.S. Cl.
CPC ............... *G05B 11/011* (2013.01); *A63J 5/12* (2013.01); *G06T 7/70* (2017.01)

(58) Field of Classification Search
CPC .......... G05B 11/011; A63J 5/12; A63J 1/028; G06T 7/70
USPC ........................................................ 702/85
See application file for complete search history.

(56) References Cited

U.S. PATENT DOCUMENTS

| | | | | |
|---|---|---|---|---|
| 10,717,631 | B2 | 7/2020 | Rudy et al. | |
| 11,919,754 | B2 * | 3/2024 | Abuhaikal | G05B 13/0275 |
| 12,192,634 | B2 * | 1/2025 | James | A01K 29/005 |
| 2005/0123188 | A1 * | 6/2005 | Leikas | G06T 7/593 |
| | | | | 382/154 |

* cited by examiner

*Primary Examiner* — Aditya S Bhat

(74) *Attorney, Agent, or Firm* — Saxton & Stump, LLC

(57) ABSTRACT

Systems and methods use a computer vision camera to determine where bridles and other rigging items are positioned and provide that information to a control system. This information is used to place the elements of the rigging system before each live performance.

20 Claims, 4 Drawing Sheets

PLACE COMPONENTS FOR CALIBRATION

100

COMPUTER VISION CAMERA CAPTURES IMAGES OF LINES AND OTHER PARTS OF RIGGING SYSTEM

110

MOVE WINCHES, SHEAVES, LINES AND OBJECT

120

COMPUTER VISION CAMERA CONTINUES TO CAPTURE IMAGES OF RIGGING SYSTEM

125

COMPUTER VISION CAMERA CONVERTS IMAGES TO DATA

130

COMPUTER VISION CAMERA
CONVERTS IMAGES TO DATA

130

DATA TRANSFERRED TO
CONTROL SYSTEM

140

CONTROL SYSTEM
PROCESSES DATA

150

USE PROCESSED DATA FOR
RIGGING SYSTEM AND OBJECT
PLACEMENT FOR A LIVE
PERFORMANCE

160

CV AUTO-CALIBRATED BRIDLE METHOD AND SYSTEM

FIELD OF THE INVENTION

The disclosure is generally related to a calibration system and method for a rigging system. More specifically, the disclosure relates to using computer vision (CV) cameras to calibrate starting positions of elements of a rigging system in an entertainment venue.

BACKGROUND OF THE INVENTION

As well as complex lighting design and sound design, the modern touring music and entertainment industry employs highly complex staging and set design in order to deliver engaging and entertaining shows, concerts or gigs. The staging may involve complex moving parts, for example in order to convey artists, musical equipment, lighting equipment or other stage equipment during the course of the performance.

Motion automation systems using multiple winches to suspend and animate flying movement of persons, objects, or equipment is well known. More recent innovations in such motion animation systems incorporate distributed control features to spread control processing computations among the on-board controls for individual motion elements to provide greater computational bandwidth at the motion automation system. Such motion automation systems frequently employ multiple winches to automate scenery and "fly" people.

It is common for even the most complex shows to be repeated in consecutive nights in different venues. Accordingly, there is a need for these complex staging systems to be rapidly assembled before the show, rapidly dissembled after the show and suitable for packing down in a compact manner for transport between venues, by road, air or boat. There is also a need for the rigging and other systems for the show to be calibrated before each performance.

In addition, even for large shows it is typical for a small number of staff to travel with the show to oversee the assembly, disassembly and packing down of the staging, with the bulk of the labor being carried out by locally-hired staff. The locally-hired staff are unlikely to be familiar with the specific staging set-up of the particular show and will have a very limited window of time to become familiar with the way in which the staging is to be assembled. This can be exacerbated in international touring, where the locally-hired staff may not speak the same language as the touring staff.

For these reasons, the base position of the winches, bridles, and other components of the rigging system will not be in the exact same position before every performance, and there is a need to calibrate the rigging and other systems before each performance. Current solutions require expensive equipment and take a long time to setup.

What is needed is a simpler, less expensive and easy to use system that takes the initial position information of a rigging system and transfers it to a control system for further processing and use during a live performance.

SUMMARY OF THE INVENTION

Systems and methods use a computer vision camera to determine where bridles and other rigging items are positioned and provide that information to a control system. This information is used to place the elements of the rigging system before each live performance.

In one embodiment, a method of calibrating a rigging system for a performance includes the steps of positioning at least two movement mechanisms to place an element being manipulated in a first position, moving the movement mechanisms such that the element being moved changes position, capturing images of the rigging system during the movement using at least one computer vision camera to determine a base position of the movement mechanisms, processing the images into a plurality of base position data using the computer vision camera, and sending the base position data to a control system. In some embodiments, the base position data received by the control system is used to set up a starting position of the movement mechanisms for a live performance.

In another embodiment, a system for calibrating a rigging system for a performance includes at least two movement mechanisms positioned to place an element being manipulated in a first position, at least one computer vision camera that captures images of the rigging system while the movement mechanisms move the element into multiple positions and converts the images into base position data, and a control system that receives the base position data from the computer vision camera.

In another embodiment, a system monitors position of a rigging system for a live performance, where the rigging system comprises a plurality of winches operably connected to a motion control system for suspending an object and animating flight thereof in a three-dimensional space. The system includes at least one computer vision camera having a field of view in which the plurality of winches are positioned, the computer vision camera configured to capture a plurality of images of the plurality of winches during movement of the rigging system and output a digitized signal representative of the images, a processing system configured to receive the digitized signals representative of the images, analyze the digitized signals to initiate a winch operation output signal indicative of a desired location for the rigging system at the beginning of the live performance, where the winch operation output signal includes a last sheave diversion location for each winch, and the motion control system configured to use the winch operation output signal from the processing system to place the rigging system and the object for the live performance.

In another embodiment, a method monitors the position of a rigging system for a live performance, where the rigging system comprises a plurality of winches operably connected to a motion control system for suspending an object and animating flight thereof in a three-dimensional space. The method includes the steps of providing at least one computer vision camera having a field of view in which the plurality of winches are positioned, configuring the computer vision camera to capture a plurality of images of the plurality of winches during movement of the rigging system and output a digitized signal representative of the images, providing a processing system to receive the digitized signals representative of the images, analyze the digitized signals to initiate a winch operation output signal indicative of a desired location for the rigging system at the beginning of the live performance where the winch operation output signal includes a last sheave diversion location for each winch, and configuring a motion control system to use the winch operation output signal from the processing system to place the rigging system and the object for the live performance.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
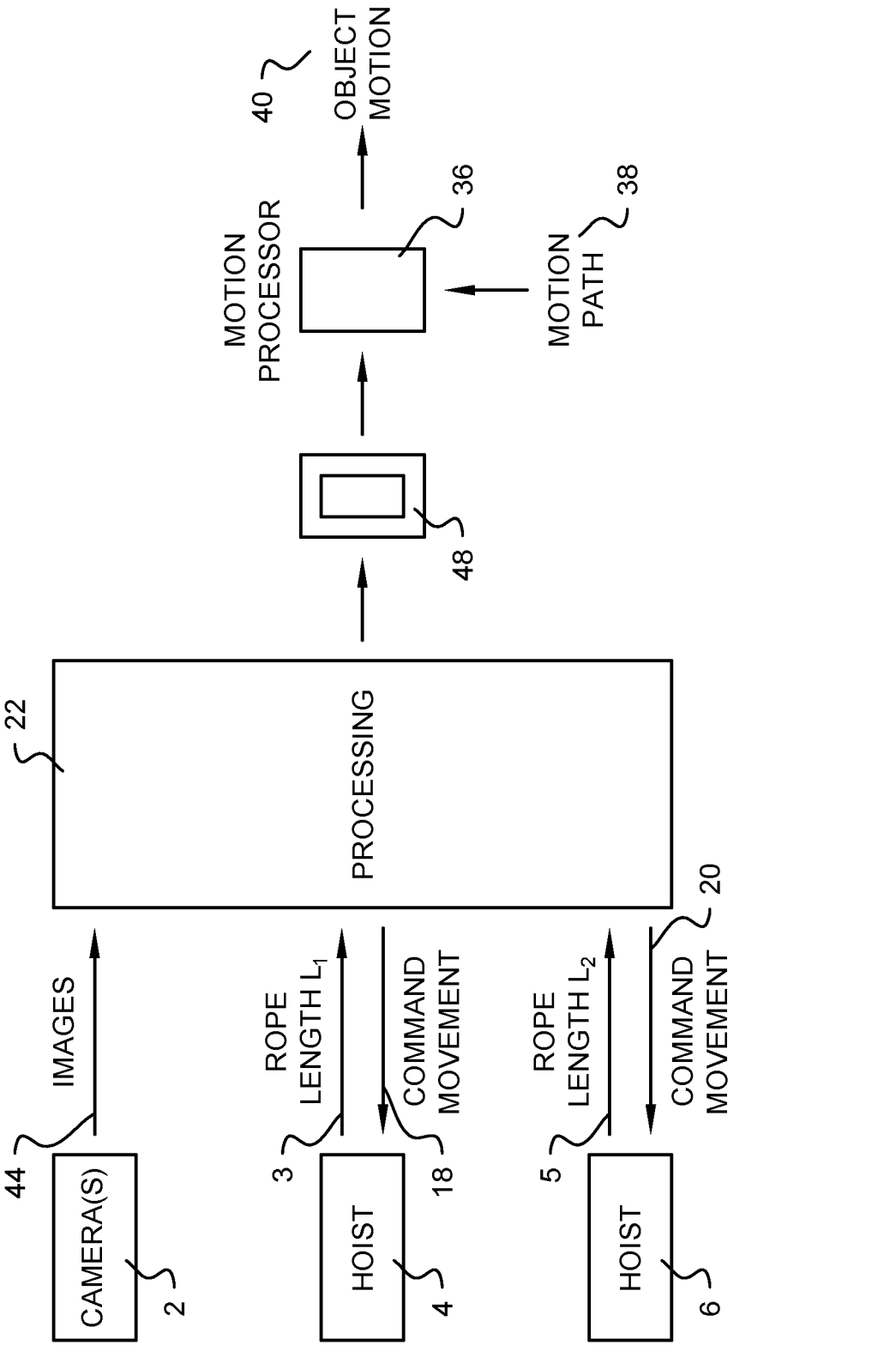
FIG. 1 shows a system of auto-calibrating a bridle and winch system in an embodiment of the present invention.

The embodiments described herein use a computer vision camera to provide location data to a control system within the entertainment industry. More specifically, a computer vision camera replaces position sensors and length measurements from the prior art. The computer vision camera determines where bridles and other rigging items are positioned and provides that information to a control system. This reduces the labor costs for bridle systems, particularly in temporary environments.

Pulleys and sheaves are used interchangeably herein to indicate a wheel or grooved wheel for hoisting or hauling, or for transmitting force to a cable, wire, wire rope, wire cable, filament, string, cord, rope, chain, or combinations thereof. The line extending from the hoists or winches to the item/object being rigged may be any type of line including, but not limited to, cable, wire, wire rope, wire cable, filament, string, cord, rope, chain, or combinations thereof, and these terms are used herein interchangeably. The terms hoists or winches are used interchangeably herein to indicate the machines lifting, lowering, or otherwise moving the lines or pulleys. A bridle or line, as defined herein, is a length of cable, wire, wire rope, wire cable, filament, string, cord, rope, chain, or combinations thereof, that can be secured at both ends to an object and slung from its center point.

Computer vision is a field of computer science that trains computers and systems to interpret and understand the visual world. Computer vision allows computers and systems to derive meaningful information from visual inputs including, but not limited to, digital images and videos. The computers and systems react to the visual inputs they "see", for example by taking actions or making recommendations based on that information.

Computer vision cameras convert the visual inputs they receive in the form of digital images and/or videos into data that can then be transferred to a computer or control system for processing. Exemplar computer vision cameras may include Intel Real Sense Depth Cam D405, Model No. 82635DSD405 and Luxinos Oak-D, Model No. A00110-INTL. These computer vision cameras feature built-in image processing capability allow them to work with conventional small computer platforms, such as an AI Box Computer, Model No. EPC-R3720 by Advantach, or even an embedded computer processor incorporated in the motion controller. Numerous other hardware options with similar specifications are commercially available and may be utilized with equal effectiveness within the scope of this disclosed invention.

In one embodiment, the system rigs an object (for example, a person, musical equipment, lighting equipment, other stage equipment, scenery, or a show prop) and the computer vision camera takes the rigging information and uses it to set up calibration (a starting point for the rigging elements) that it transmits to a control system that is used during the performance.

The computer vision camera is utilized to determine where items or equipment are initially positioned. Once the camera obtains this information by capturing images and converting them into data, it inputs the data into the control system.

The method includes obtaining images of the rigging system at default points, and while the system is moving, to create data points for the control system. The computer vision camera is able to capture all of the initial positions of the rigging system, and transfer that position information to the control system. In preferred embodiments, instead of a static system, the calculations are done using moving objects. More specifically, the computer vision camera captures the images while the rigging system is moving to create accurate initial position information. The computer vision camera is able to capture multiple movement mechanisms, such as winches, working together.

The rigging system is preferably part of an often complex set design for a live performance at an entertainment venue.

The rigging system includes winches, lines and sheaves, a computer vision camera, and a control system to process the information received from the computer vision camera. The computer vision camera inputs all of the initial positions, which are sent to the control system for further processing. The embodiments described herein are able to map the movement of the sheaves and provide to the control system information relating to the location of items and equipment in the rigging system. The computer vision camera takes the images it "sees" (preferably while the rigging system is in motion), converts it to data (for example, in the form of distances), and sends it to the control system for processing.

In preferred embodiments, instead of a static system, the locations are calculated from moving objects.

While there may be a single winch, line and sheave, in preferred embodiments, there are multiple winches, lines and sheaves. In some embodiments, the number of winches, lines and sheaves may be two, three, four, five, six, or more than six.

For example, in one embodiment, there are four winches, each with a line attached to it, that runs through the sheave, and connects to the object/item being flown. The system preferably includes multiple hoists/winches and sheaves.

One advantage of the embodiments described herein include reduction in labor costs for the improved bridle system in particular in temporary environments. Another advantage is replacing the cost of total stations with an inexpensive camera.

Live performances often use a lot of multi-line bridles and they need to be setup in the software by telling the software where everything is. The system and method of the present invention allows auto-calibration of "points" (final pulleys) for the bridle so the user does not need to do so manually. Currently, this process is required at every tour stop.

The system uses a camera to monitor a bridle's movement to determine key setup parameters to actively move the bridle using 3D motion paths. By moving each winch motor one at a time and measuring the movement of the object, the positions of the sheaves are calculated and the object can be easily moved after the calibration process.

To do the calibration, each winch is moved and the effect of the movements are measured by the camera. By knowing how far the winch is moved from the initial winch position, the camera gets calibrated to the space and the object movement gets measured. With the measured motion, the 3D location of where the rope or chain is coming from is calculated. With the calculation, the 3D motion of each winch can be calculated to get the desired 3D motion of the object.

The object can be identified either by motion identification or an identifying mark.

The movement mechanism can be any type of machine that is capable of creating movement, including, but not limited to, winches, hoists, hydraulic linear actuators or electric linear actuators. The objects preferably hang from rope/cable (made of steel, synthetic, or other material) or chain. In one embodiment, the mechanism is a winch where a rope is wrapped on a drum.

Pulley mechanisms can be any type of pulley that is capable of creating movement, such as sheaves or pulleys.

In some embodiments, true-range multilateration (also known as range-range, rho-rho and spherical multilateration) calculates and calibrates the locations and dimensions of the rigging system. This method determines the location of the object using multiple distances between the object and the other components of the rigging system.

A goal of the calculations is to find the last sheave diversion location (Pw). Since the sheaves are often far from the visual eye (and/or the cameras being used for calibration) in a venue, these locations are difficult to see and determine. So, other components of the rigging system, including the length of rope (L), the winches and the location of the object (Pc), are used to determine the last sheave diversion location (Pw).

The last sheave diversion location (Pw) can be really far away and hard to see. Generally, the computer vision system collects Pc points (the location of the object) and combines that with the length (L) of the line. Then the calibration process calculates the last sheave diversion location (Pw). In the prior art, the sheave locations were surveyed using tools that construction surveyors use because they are so small and need to be calculated fairly precisely. In contrast, in the present invention, the location of the last sheave diversion location (Pw) is calculated based on the movements of the object, which are much easier to see. Therefore, low-cost cameras are used instead of survey equipment.

When doing this calculation process, the control system has to coordinate with the motion controller to match the camera frames with the correct winch length. In the calibration phase of the process, the winches are being moved but the system does not yet have the calibration information to know how to command the object to move and calculate what the winches should do. The motion control varies L of the winch but the motion controller is not yet able to calculate where the object is in space.

In the motion control phase of the process, the system uses the calculated calibration data of locations Pw to calculate L to put the object in a place in 3D space. The calibration process can continue when the motion control has the locations and is doing object control.

Figure 2:
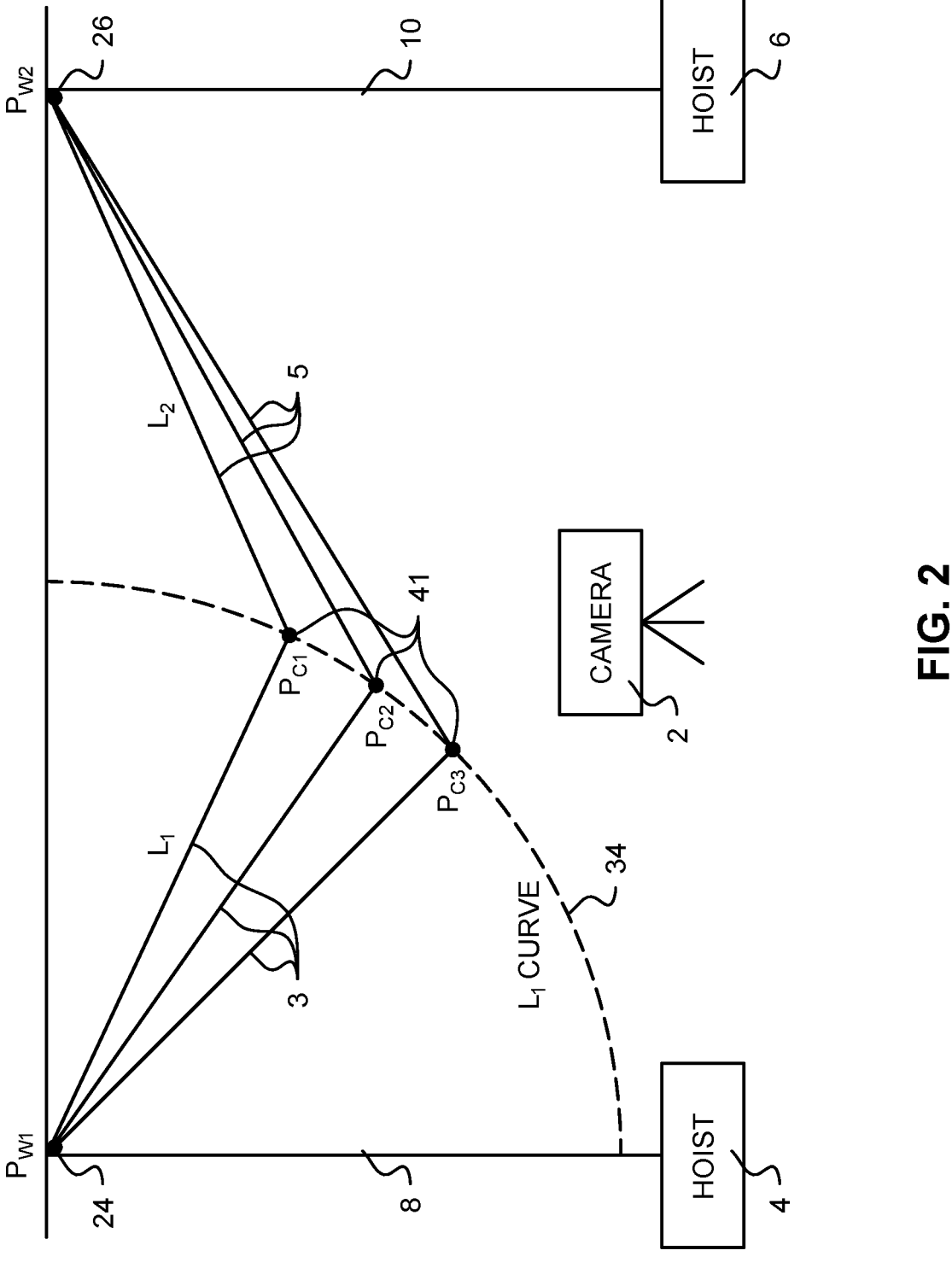
FIG. 2 shows elements of the system of FIG. 1 and data points used for the calibration.

Referring now to FIGS. 1 and 2, two winches 4, 6 include sheaves 24, 26, respectively. The first winch 4 has a sheave 24 and a line 8 that runs from the winch 4 through the sheave 24 to an object 41 being rigged. The second winch 6 has a sheave 26 and a line 10 that runs from the winch 6, through the sheave 26, to the same object 41 being rigged. The bridles or lines 8, 10 may be any line including, but not limited to, cable, wire, wire rope, wire cable, filament, string, cord, rope, chain, or combinations thereof. The object 41 may be any object that will be in motion at some point during the live performance, including, but not limited to, a person, musical equipment, lighting equipment, scenery, truss structures, pyrotechnic equipment, special effects equipment, projectors, projection surfaces, LED video, sandbags for testing, cameras, other stage equipment, or other objects.

While the winches 4, 6 are in motion, one or more cameras 2 take multiple images 44, which are processed 22 into data 48 that is transferred to a motion processor 36. The data 48 includes the positions ($P_{C1}$, $P_{C2}$, $P_{C3}$) the rigged object 41 travels along a trajectory 34 ($L_1$ curve) as it moves. While three points ($P_{C1}$, $P_{C2}$, $P_{C3}$) are shown in the figures, the images from the camera 2 may collect additional or less points along the trajectory 34 of the object depending upon the complexity of the system. The $L_1$ line length 3 of the first winch 4 is also measured, processed 22, and a first command movement 18 is returned to the winch 4. Similarly, the $L_2$ line length 5 of the second winch 6 is measured, processed, and a second command movement 20 is returned to the winch 6. The positions ($P_{W1}$, $P_{W2}$) of the sheaves 24, 26 for the winches 4, 6, respectively, are calculated using the L and Pc data 48 obtained by the camera 2. The $P_{W1}$ and $P_{W2}$ values are transferred to the motion processor 36 at the end of calibration. The motion processor 36 takes in the information about the motion path 38 and outputs the object motion 40.

Although only one camera is shown in the Figures, additional cameras may be used depending upon the complexity of the rigging system. Although only two winches 4, 6 are shown in the Figures, additional winches may be used depending upon the complexity of the rigging system.

To do the calibration, each winch 4, 6 is moved and the effect of the movements are measured by the camera 2. The line 8, 10 extend from the winches 4, 6 over the sheave or pulley 24, 26 and to the object 41 or location in the space where the rigging system is being used. By knowing how far the winch 4, 6 is moved, the camera 2 gets calibrated to the space and the object movement gets measured. The camera processes 22 the movement, calculating $P_{W1}$ and $P_{W2}$ using $L_1$, $L_2$, $P_{C1}$, $P_{C2}$, and $P_{C3}$, and uses the $P_{W1}$ and $P_{W2}$ positions of the sheaves 24, 26 to further process the motion path 38 with a motion processor 36. Processing results in processed object motion 40. With the measured object motion 40, the 3D location of where the rope, chain, or line 8, 10 is coming from is calculated.

FIG. 2 shows the length $L_1$ 3 and $L_2$ 5 of the lines 8, 10 and the points $P_{C1}$, $P_{C2}$ and $P_{C3}$ where the two lines 8, 10 meet and work together create movement. The $L_1$ curve 34 due to movement of the winches 4, 6 is also shown in FIG. 2. The 3D motion of each winch 4, 6 can be calculated to get the desired 3D motion (shown by $P_{C1}$, $P_{C2}$ and $P_{C3}$) of the object 41. The positions ($P_{W1}$, $P_{W2}$) of the sheaves 24, 26 for the winches 4, 6, respectively, are calculated using the data ($L_1$, $L_2$, $P_{C1}$, $P_{C2}$, and $P_{C3}$) obtained by the camera 2. The motion of the winches 4, 6 provide location information to the camera 2, which it then processes and provides to the control system 36 in advance of the live performance.

The system and method monitors position of the winches 4, 6, sheaves 24, 26 and lines 8, 10 for a live performance. In some preferred embodiments, the rigging system is used to suspend an object 41 and animating flight thereof in a three-dimensional space. The computer vision camera 2 has a field of view in which the plurality of winches 4, 6 are positioned. The computer vision camera is configured to capture a plurality of images of the plurality of winches 4, 6 during movement of the rigging system and output a digitized signal representative of the images. The processing system 36 receives the digitized signals representative of the images, and analyzes the digitized signals to initiate an output indicative of a desired location for the rigging system at the beginning of the live performance. This information from the processing system is used to place the rigging system and the object 41 for the live performance.

Figure 3:
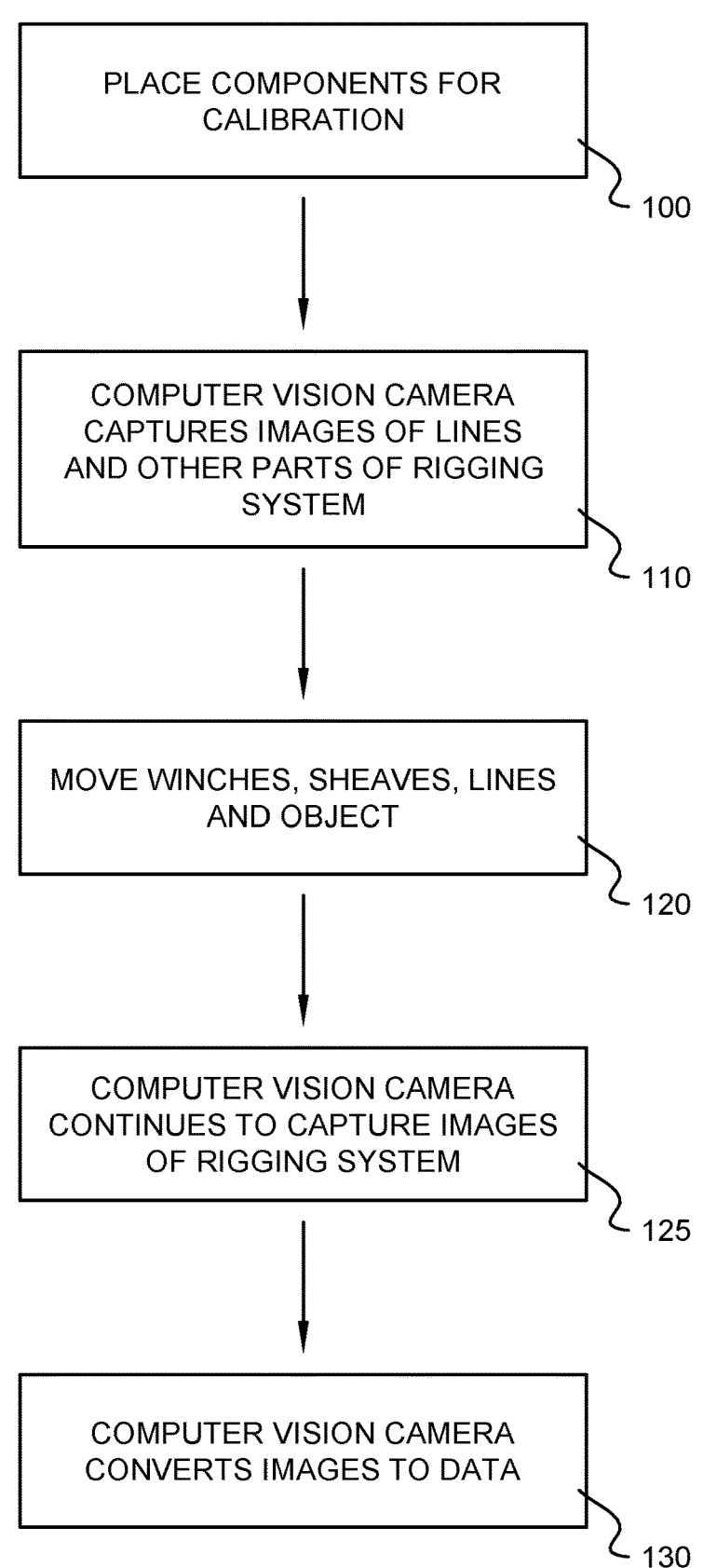
FIG. 3 shows a method of calibrating a rigging system in an embodiment of the present invention.
Figure 4:
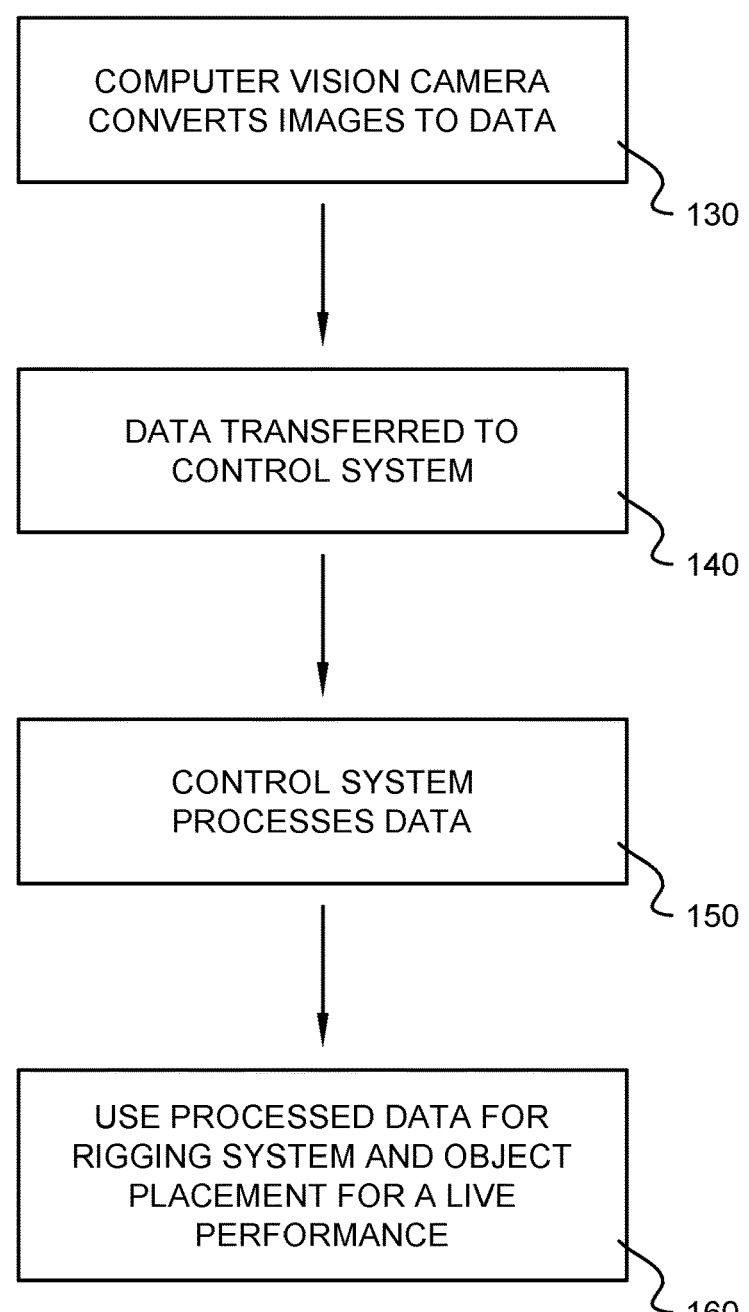
FIG. 4 shows additional steps of the method of FIG. 3.

FIGS. 3 and 4 show a flowchart of a method of the present invention. The components of the rigging system, including the winches 4, 6, sheaves 24, 26, and lines 8, 10, are placed for the calibration in step 100. The location of the lines 8, 10 (with or without the object 41 that will be moved during the live performance) and the other parts of the rigging system are captured by the computer vision camera 2 in step 110. The lines 8, 10 are moved, creating a trajectory 34 for the object 41 in the rigging system, in step 120.

During the movement, the computer vision camera 2 continues to capture images of the rigging system in step 125. Each winch 4, 6 is moved individually and the computer vision camera 2 takes images of the rigging system. When the images are taken, $L_1$, $L_2$ of each winch 4, 6 is precisely captured. The computer vision camera 2 converts the images to data in step 130. In each image, the location of the object in each image is calculated to get Pc. Preferably, at least three images are captured for each winch 4, 6. The length (L) of the rope and positions of the object (Pc) are used to calculate Pw for each winch 4, 6.

The data is transferred to a control system 36 for use during the live performance, in step 140. More specifically, the data includes all the calculated Pw values, which are transferred to the motion controller 36 at the end of calibration. The received data is processed by the control system 36 in step 150. The motion control system 36 is now able to control the object because it knows where all the winches (last sheave diversion locations Pw) are. The processed data is used by the control system 36 for rigging system and object placement for the live performance in step 160.

While the present invention is described with the camera watching an object move, in alternative embodiments, the camera is placed on the object and senses how the world has moved rather than watching the object move.

In some embodiments of the invention, all the principles in a 2D version can be applied in a 3D context. Some situations will require multiple cameras (stereo camera or two separate cameras) in 3D embodiments.

Since cameras are inexpensive and embedded computer vision is becoming economically practical, the embodiments described herein reduce the cost of the equipment required and the time to setup each time.

While only certain features and embodiments of the invention have been shown and described, many modifications and changes may occur to those skilled in the art (for example, variations in sizes, dimensions, structures, shapes and proportions of the various elements, values of parameters (for example, temperatures, pressures, etc.), mounting arrangements, use of materials, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A method of calibrating a rigging system for a performance, comprising the steps of:
    a) providing at least two movement mechanisms to a venue, the at least two movement mechanisms being arranged and disposed to position an element in a first position;
    b) activating the movement mechanisms and moving the element with the movement mechanisms;
    c) capturing a plurality of visual inputs of the element with at least one computer vision camera during the movement of the element in step b), the at least one computer vision camera converting the visual inputs into data capable of being transferred to a control system for processing;
    d) transmitting the data to the control system and determining a base position of a component of one or more of the at least two movement mechanisms from the data with the control system; and
    e) configuring the control system to include the base position of the component corresponding to the venue to enable the control system to precisely move the element within the venue.

2. The method of claim 1, wherein the movement mechanisms comprise a plurality of winches.

3. The method of claim 2, wherein each winch includes a winch mechanism, a sheave and a line that runs from the winch mechanism through the sheave to the element being rigged.

4. The method of claim 2, wherein the base position includes a last sheave diversion location for each winch.

5. The method of claim 1, wherein the movement mechanisms comprise at least four winches.

6. The method of claim 1, wherein the element being rigged is selected from the group consisting of musical equipment, lighting equipment, stage equipment, at least one prop, a human, scenery, at least one truss structure, pyrotechnic equipment, special effects equipment, at least one projector, at least one projection surface, LED video, at least one sandbag, and at least one camera.

7. The method of claim 1, wherein the at least two movement mechanisms comprise:
    a first movement mechanism including a first winch mechanism, a first sheave and a first line that runs from the first winch mechanism through the first sheave to the element; and
    a second movement mechanism including a second winch mechanism, a second sheave and a second line that runs from the second winch mechanism through the second sheave to the element;
    wherein the activating and moving of step b) includes moving the element with the first winch mechanism and maintaining the second winch mechanism in a stationary position, the capture of step c) includes capturing a plurality of visual inputs of the element while the first winch mechanism moves the element.

8. The method of claim 7, wherein the component includes the first sheave and the base position includes the position of the first sheave within the venue.

9. A system for calibrating a rigging system for a performance, comprising:

a) at least two movement mechanisms positioned in a venue to position an element in a first position;

b) at least one computer vision camera that captures visual inputs of the element while the movement mechanisms move the element into multiple positions and converts the visual inputs into data capable of being transferred to a control system for processing; and c) a control system that receives the data from the computer vision camera, the control system determining a base position of a component of one or more of the at least two movement mechanisms from the data; wherein the control system is configurable to include the base position of the component corresponding to the venue to enable the control system to precisely move the element within the venue.

10. The system of claim 9, wherein the movement mechanisms comprise a plurality of winches.

11. The system of claim 10, wherein each winch includes a winch mechanism, a sheave and a line that runs from the winch mechanism through the sheave to the element being rigged.

12. The method system of claim 10, wherein the base position data includes a last sheave diversion location for each winch.

13. The system of claim 9, wherein the movement mechanisms comprise at least four winches.

14. The system of claim 9, wherein the element being rigged is selected from the group consisting of musical equipment, lighting equipment, stage equipment, at least one prop, a human, scenery, at least one truss structure, pyrotechnic equipment, special effects equipment, at least one projector, at least one projection surface, LED video, at least one sandbag, and at least one camera.

15. A system for monitoring position of a rigging system for a live performance, the rigging system comprising a plurality of winches operably connected to a motion control system for suspending an object and animating flight thereof in a three-dimensional space, the system comprising:

a) at least one computer vision camera having a field of view in which the object is positioned, the computer vision camera configured to capture visual inputs of the object during movement of the object and output a digitized signal representative of the visual inputs;

b) a processing system configured to receive the digitized signals representative of the visual inputs, analyze the digitized signals to determine a base position of a component of one or more of the rigging system from the digitized signals, and configure the motion control system to include the base position of the component corresponding to the three-dimensional space to enable the control system to precisely move the element within the three-dimensional space; and c) the motion control system configured to use the base position from the processing system to move the object for the live performance.

16. The system of claim 15, wherein each winch includes a winch mechanism, a sheave and a line that runs from the winch mechanism through the sheave to the object being rigged.

17. The system of claim 15, wherein the object being rigged is selected from the group consisting of musical equipment, lighting equipment, stage equipment, at least one prop, a human, scenery, at least one truss structure, pyrotechnic equipment, special effects equipment, at least one projector, at least one projection surface, LED video, at least one sandbag, and at least one camera.

18. A method for monitoring position of a rigging system for a live performance, the rigging system comprising a plurality of winches operably connected to a motion control system for suspending an object and animating flight thereof in a three-dimensional space, comprising the steps of:

a) providing at least one computer vision camera having a field of view in which the object is positioned;

b) configuring the computer vision camera to capture a visual inputs of the object during movement of the object and output a digitized signal representative of the visual inputs;

c) providing a processing system to receive the digitized signals representative of the visual inputs, analyze the digitized signals to determine a base position of a component of one or more of the rigging system from the digitized signals, and configure the motion control system to include the base position of the component corresponding to the three-dimensional space to enable the control system to precisely move the element within the three-dimensional space; and d) configuring the motion control system to use the base position from the processing system to move the object for the live performance.

19. The method of claim 18, wherein each winch includes a winch mechanism, a sheave and a line that runs from the winch mechanism through the sheave to the object being rigged.

20. The method of claim 18, wherein the object being rigged is selected from the group consisting musical equipment, lighting equipment, stage equipment, at least one prop, a human, scenery, at least one truss structure, pyrotechnic equipment, special effects equipment, at least one projector, at least one projection surface, LED video, at least one sandbag, and at least one camera.

\* \* \* \* \*